(12) United States Patent
Bleyer et al.

(10) Patent No.: US 12,555,190 B2
(45) Date of Patent: Feb. 17, 2026

(54) FOVEATED TEMPORAL FILTERING

(71) Applicant: Microsoft Technology Licensing, LLC, Redmond, WA (US)

(72) Inventors: Michael Bleyer, Seattle, WA (US); Christopher Douglas Edmonds, Carnation, WA (US); Christian Markus Maekelae, Redmond, WA (US); Pascal Pare, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 18/537,500

(22) Filed: Dec. 12, 2023

(65) Prior Publication Data
US 2025/0191126 A1    Jun. 12, 2025

(51) Int. Cl.
*G06T 5/50*     (2006.01)
*G06T 3/40*     (2006.01)
*G06T 5/20*     (2006.01)

(52) U.S. Cl.
CPC ............... *G06T 5/20* (2013.01); *G06T 3/40* (2013.01); *G06T 5/50* (2013.01); *G06T 2207/20201* (2013.01); *G06T 2207/20212* (2013.01)

(58) Field of Classification Search
CPC .... G06T 5/20; G06T 3/40; G06T 5/50; G06T 2207/20201; G06T 2207/20212
See application file for complete search history.

(56) References Cited

U.S. PATENT DOCUMENTS

2024/0031540 A1* 1/2024 Wu ........................... G06T 3/40

* cited by examiner

*Primary Examiner* — Kent Yip
(74) *Attorney, Agent, or Firm* — Workman Nydegger

(57) ABSTRACT

A system for generating foveated imagery is configurable to: (i) access an image; (ii) identify an ROI of the image; (iii) generate a downsampled image by performing downsampling on the image; (iv) generate a transformed downsampled image by performing one or more image processing operations on the downsampled image; (v) generate a transformed image by performing upsampling on the transformed downsampled image; and (vi) generate a foveated image by using the ROI of the image to define a corresponding ROI of the transformed image.

20 Claims, 7 Drawing Sheets

FOVEATED TEMPORAL FILTERING

BACKGROUND

Mixed-reality (MR) systems, including virtual-reality and augmented-reality systems, have received significant attention because of their ability to create truly unique experiences for their users. For reference, conventional virtual reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment to the user. A pass-through view can aid users in avoiding disorientation and/or safety hazards when transitioning into and/or navigating within a mixed-reality environment. Pass-through views may also enhance user views in low-visibility environments. For example, mixed-reality systems configured with long-wavelength thermal imaging cameras may facilitate visibility in smoke, haze, fog, and/or dust. Likewise, mixed-reality systems configured with low-light imaging cameras facilitate visibility in dark environments where the ambient light level is below the level required for human vision.

An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

Pass-through imaging can provide various beneficial user experiences, such as enabling users to perceive their surroundings in situations where ordinary human perception is limited. For instance, an MR system may be equipped with thermal cameras and be configured to provide pass-through thermal imaging, which may enable users to perceive objects in their environment even when smoke or fog is present. As another example, an MR system may be equipped with low light cameras and be configured to provide pass-through low light imaging, which may enable users to perceive objects in dark environments.

In the example of low light imaging conditions, individual image frames captured by an image sensor may fail to capture sufficient scene information to provide an interpretable image to the user. When the image sensor is implemented on a moving user device, such as an MR system, implementing a long exposure time to enable an image frame to capture additional scene information can result in blurred images (e.g., brought about by motion of the image sensor during image capture).

Accordingly, many low light image sensors operate by capturing temporally consecutive image frames and combining the consecutive image frames (i.e., performing temporal filtering) to generate output imagery for display to a user. Many systems perform motion compensation to account for motion of the image sensor while capturing the temporally consecutive image frames. For instance, inertial tracking data may be obtained while capturing consecutive image frames, and the inertial tracking data may be used to align the consecutive image frames (e.g., to a current position, or to a position at which output imagery will be displayed). The aligned image frames may then be combined from output imagery that includes more scene information than an individual image frame could provide on its own.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

To describe how the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Figure 1:
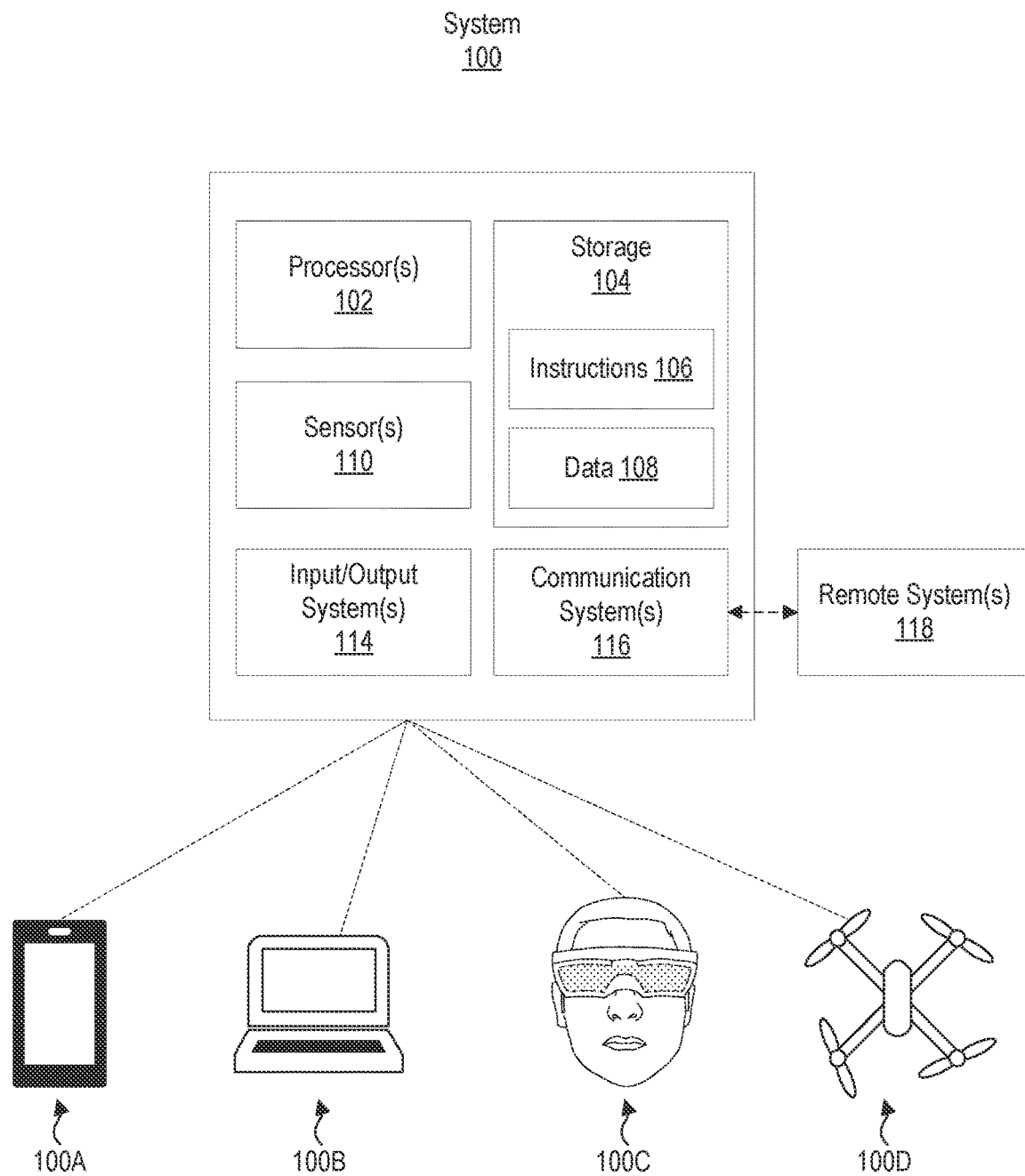
FIG. 1 illustrates example components of an example system that may include or be used to implement one or more disclosed embodiments.

Disclosed embodiments are generally directed to systems, methods, and apparatuses for generating foveated imagery, performing foveated temporal filtering, and performing foveated motion compensation.

Examples of Technical Benefits, Improvements, and Practical Applications

As noted above, many image sensors operate by acquiring temporally consecutive image frames and combining the consecutive image frames to generate output imagery for display to a user. A previous image frame can be combined with a current image frame (e.g., using a weight map) to provide the output image. Such methods for combining temporally consecutive image data to generate an output image is referred to herein as "temporal filtering". In one example, to perform temporal filtering, a current frame and a previous frame are used as inputs, and an output image is computed as a weighted average of the two frames. In some instances, the previous frame comprises a previously generated output image, such that only two images are used in the image processing pipeline. Upon acquisition of a new output image, the new output image can be stored for use as a previous frame to be combined with a subsequently captured frame to generate a subsequent output image.

To facilitate alignment of a previous image frame and a current image frame prior to (or as part of) temporal filtering, many systems perform motion compensation to account for motion of the image sensor during image capture. Often, inertial tracking data is obtained during image capture, and the inertial tracking data is used to align the temporally consecutive image frames. In some implementations, inertial tracking data is acquired using an inertial measurement unit (IMU), which may comprise one or more accelerometers, gyroscopes, magnetometers, etc. Temporal filtering methods may employ additional or alternative types of motion compensation techniques, such as those that at least partially rely on optical flow calculations. In some instances, temporal filtering does not utilize motion compensation.

Temporal filtering is often utilized by mobile or wearable devices, such as HMDs (e.g., MR devices). Computational resources are relatively low on such mobile devices, which makes it difficult to perform temporal filtering on high-resolution images at a high framerate. A simple way to reduce the quantity of pixels on which temporal filtering is performed (and therefore reduce the computational burden of temporal filtering) is to perform pixel binning. Pixel binning, in one example, can include merging 2×2 pixel blocks into single pixels via averaging or summing of the four original pixel values (e.g., intensity values). Pixel binning can result in the loss of angular pixel resolution, which can make it difficult for users to identify distant objects in the resulting temporally filtered images.

At least some disclosed embodiments are directed to utilizing foveation in temporal filtering to achieve a favorable trade-off between computational burden and range detection or angular pixel resolution in output imagery. Foveation can involve the assumption that not all regions of the image are equally important. Systems can thus focus on maintaining the highest possible angular pixel resolution in the part of the image that is of interest (e.g., the part of the region where the user is looking or likely to look), while using lower resolution for the rest of the image. At least some aspects of the disclosed subject matter are directed to (1) utilizing a dual layer representation of foveated image content, (2) a temporal filter pipeline that utilizes foveation and supports a high degree of parallelization, and (3) a foveated motion compensation technique.

Although at least some examples herein are focused, in at least some respects, on facilitating foveated imaging, temporal filtering, and/or motion compensation on HMD imagery, one will appreciate, in view of the present disclosure, that the principles discussed herein may be applied to any type of imagery (e.g., images captured by one or more mobile electronic devices, smartphones, tablets, smartwatches, drones, autonomous vehicles, etc.).

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise one or more computer-readable recording media and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles), combinations thereof, etc. A system 100 may take on other forms in accordance with the present disclosure.

Foveated Image Representation, Temporal Filtering, and Motion Compensation

Figure 2:
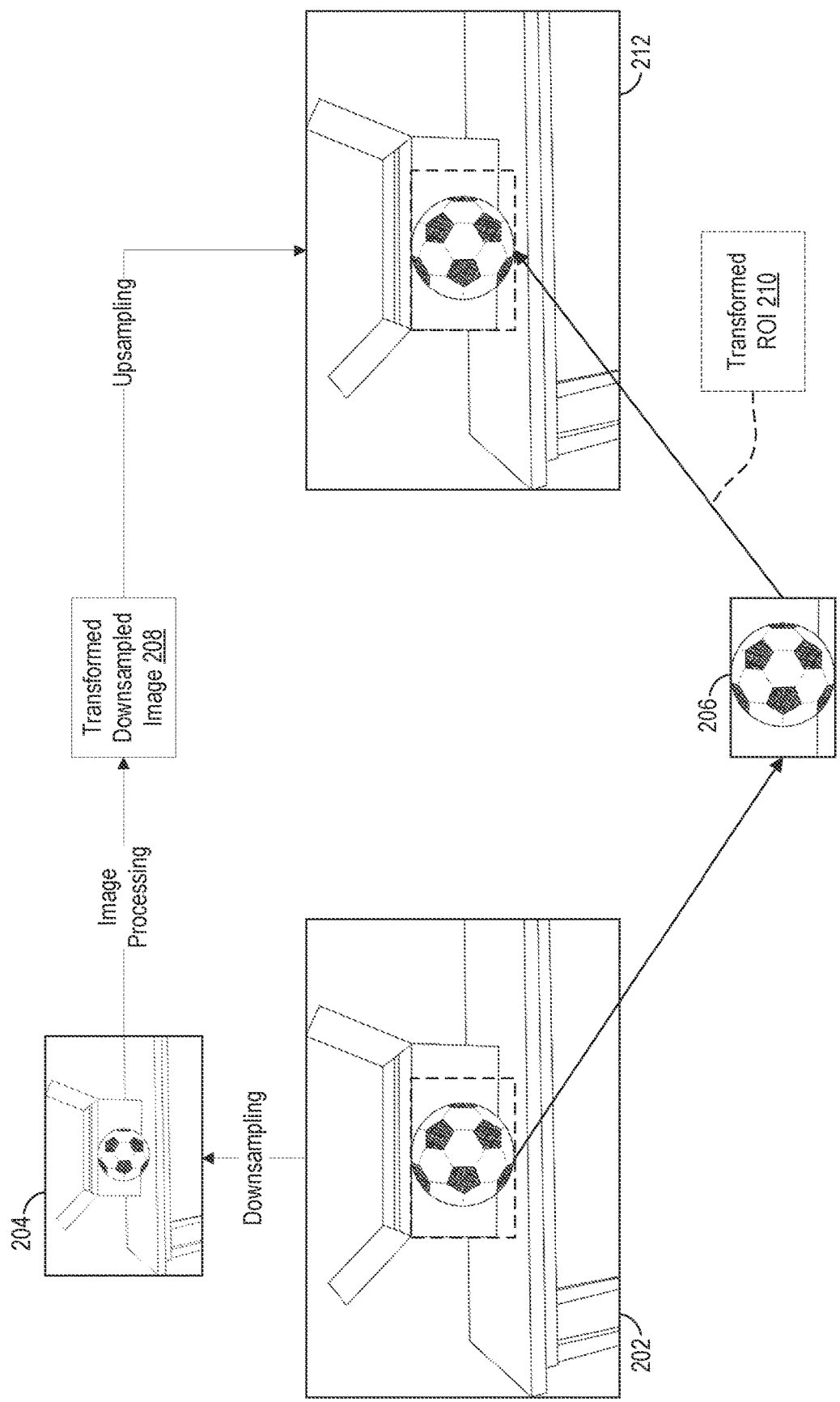
FIG. 2 illustrates a conceptual representation of generating foveated imagery, in accordance with implementations of the present disclosure.

FIG. 2 illustrates a conceptual representation of generating foveated imagery, in accordance with implementations of the present disclosure. In particular, FIG. 2 illustrates an image 202, which a system may access and perform various operation on to generate a foveated image. For example, the image 202 may comprise an image captured by a movable electronic device, such as a smartphone, tablet, vehicle (e.g., a drone, electric vehicle, autonomous vehicle), HMD, camera, or other device.

FIG. 2 shows the image 202 being separated into multiple layers to facilitate generation of a foveated image. For instance, the image 202 of FIG. 2 is used to generate a downsampled image 204 by performing downsampling on the image 202. Downsampling involves reducing the spatial resolution of an image, resulting in a smaller-sized image (e.g., downsampled image 204) that at least partially retains visual content of the input image (e.g., image 202). Any suitable downsampling techniques can be used to generate the downsampled image 204, such as average downsampling, subsampling, decimation, Gaussian downsampling, and/or others. In some instances, downsampling operations are performed iteratively to achieve a small final image size in a computationally efficient manner. In the example of FIG. 2, the downsampled image 204 is obtained via 2×2 pixel averaging, resulting in the downsampled image 204 having 25% of the original pixel count of the image 202.

FIG. 2 also illustrates an additional layer obtained based on the image 202. For instance, FIG. 2 illustrates a region of interest 206 (ROI 206) identified from the image 202. The ROI 206 can correspond to the portion of the image 202 that is the subject of user attention, or that is expected to be the subject of user attention. For example, users often direct their gaze to the center of an image. Accordingly, the ROI 206 can correspond to the center region of the image 202, as shown in FIG. 2. In the example of FIG. 2, the image 202 is separated into 3×3 equally sized regions (i.e., rectangular regions), and the ROI 206 is defined using the center region (indicated in FIG. 2 by the dashed rectangle within the image 202). In this way, the ROI 206 of the image 202 can be defined as a pixel region of the image 202 with pre-defined coordinates (e.g., the center region).

In some implementations, the ROI 206 is a pixel region of the image 202 with coordinates that are defined based on eye tracking data. Eye tracking can involve monitoring and recording the movement and gaze patterns of a person's eyes, which can indicate where a person is looking. Eye tracking can involve utilizing specialized hardware (e.g., sensor(s) 110) such as eye tracking devices or cameras to capture eye movements. Various eye tracking techniques can be used to acquire eye tracking data for determining the coordinates of the ROI 206, such as pupil center corneal reflection, dark or bright pupil tracking, etc. The eye tracking data can be used to determine a gaze point or pixel coordinate on the image 202, and the ROI 206 can be centered about the gaze point or pixel coordinate.

The ROI 206 can maintain the pixel resolution of the image 202. As noted above, in the example of FIG. 2, the ROI 206 comprises the middle region of the image 202, which includes ⅑ (about 11%) of the pixel count of the image 202. Taken together, the downsampled image 204 and the ROI 206 include about 36% of the original pixel count of the image 202. Thus, image processing operations may be performed on the downsampled image 204 and/or the ROI 206 with significantly less computational cost than performing such operations on the entire image 202. After image processing, the different layers/parts can be recombined to form a foveated image.

FIG. 2 illustrates a conceptual representation of performing image processing on the downsampled image 204 to obtain a transformed downsampled image 208. FIG. 2 also illustrates that a transformed ROI 210 can be obtained by performing additional image processing, in some implementations. In some instances, the transformed downsampled image 208 and the transformed ROI 210 can be generated in parallel. Image processing for obtaining the transformed downsampled image 208 and/or the transformed ROI 210 can include techniques for enhancing visual quality, correcting imperfections, and/or otherwise enhancing output imagery for user experiences. For example, image processing performed to generate the transformed downsampled image 208 and/or the transformed ROI 210 can include temporal filtering (e.g., foveated temporal filtering, described in more detail hereinafter), motion compensation, contrast adjustment, color correction, image sharpening, noise reduction, filtering, anti-aliasing, and/or others.

As noted above, the downsampled image 204 and the ROI 206 can comprise a smaller total pixel count than the image 202 (e.g., about 36% of the original pixel count of the image 202). Accordingly, image processing operations can advantageously be performed on the downsampled image 204 and/or the ROI 206 to obtain the transformed downsampled image 208 and/or the transformed ROI 210, respectively, with less computational cost than performing such image processing operations on the image 202. Furthermore, image processing operations can be performed on the downsampled image 204 and the ROI 206 in parallel, which can further improve computational efficiency.

After acquiring the transformed downsampled image 208 by performing one or more image processing operations, upsampling can be performed on the transformed downsampled image 208 to bring the transformed downsampled image 208 to the original resolution of the image 202. The upsampled version of the transformed downsampled image 208 can be regarded as a "transformed image". Upsampling can include various image interpolation or resolution enhancement techniques, which can be performed iteratively to increase the resolution of an image. Upsampling techniques can include, by way of non-limiting example, bilinear interpolation, bicubic interpolation, nearest-neighbor interpolation, Lanczos resampling, super-resolution techniques, edge-directed interpolation, edge-preserving filtering (e.g., joint bilateral filtering), and/or others.

The output of upsampling the transformed downsampled image 208 (e.g., the transformed image) can be combined with the ROI 206 (or the transformed ROI 210, if image processing is performed on the ROI 206) to generate a foveated image 212. In one example, the ROI 206 (or the transformed ROI 210) is used to define a corresponding region of interest for the foveated image 212. For instance, pixel values from the ROI 206 (or the transformed ROI 210) can be used for corresponding pixel coordinates from the transformed image to obtain the foveated image 212. The corresponding pixel coordinates from the transformed image that can receive pixel values from the ROI 206 (or the transformed ROI 210) can comprise pixels in the center region or in another area of user attention (e.g., determined based on eye tracking), indicated in FIG. 2 by the dashed rectangle within the foveated image 212. In some instances, generating the foveated image 212 can include copying image data from the ROI 206 (or the transformed ROI 210) to the corresponding region of interest of the transformed image.

Figure 3:
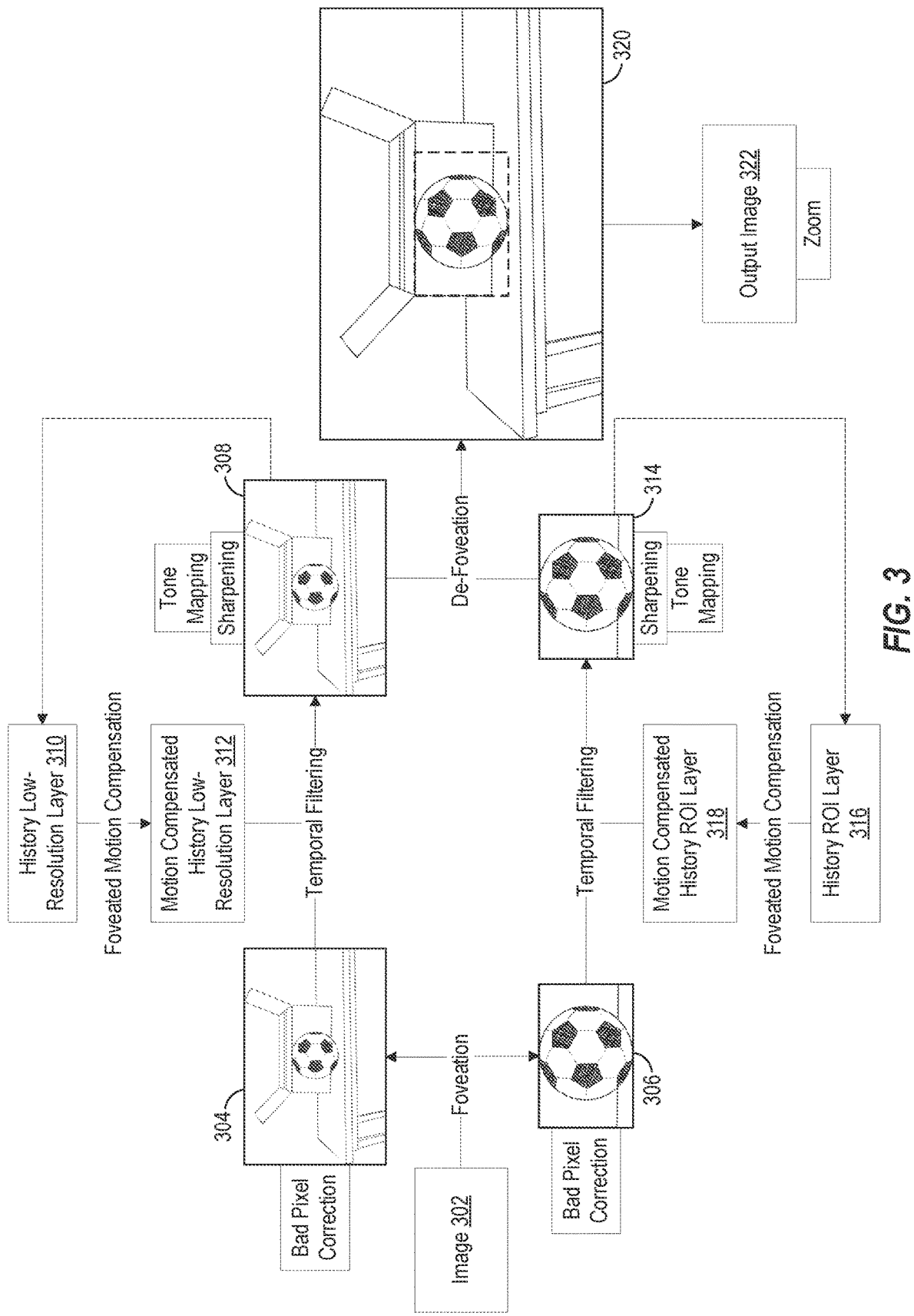
FIG. 3 illustrates a conceptual representation of performing foveated temporal filtering, in accordance with implementations of the present disclosure.

As suggested above, an image can be separated into a downsampled layer and a region of interest layer to enable performance of foveated temporal filtering, which is described in more detail with reference to FIG. 3. FIG. 3 illustrates an image 302, which can be conceptually similar to the image 202. In the example of FIG. 3, foveation is performed on the image 302, which includes separating the image 302 into a low-resolution layer 304 (similar to downsampled image 204) and an ROI layer 306 (similar to ROI 206). In this regard, performing foveation on the image 302 can include downsampling the image 302 to obtain the low-resolution layer 304 and identifying or selecting an ROI from the image 302 to obtain the ROI layer 306.

In some implementations, one or more corrective operations are performed on the low-resolution layer 304 and/or the ROI layer 306 prior to further processing of the low-resolution layer 304 and/or the ROI layer 306. In some implementations, the corrective operations can be performed in parallel. FIG. 3 illustrates an example corrective operation of "bad pixel correction", which may be performed on the low-resolution layer 304 and/or the ROI layer 306. Bad pixel correction operations can include performing one or more operations to compensate for image noise in the low-resolution layer 304 and/or the ROI layer 306, such as fixed pattern noise (e.g., noise resulting from dark/leakage current and/or other sensor imperfections). Computational resources can be utilized efficiently by performing bad pixel correction operations on the low-resolution layer 304 and the ROI layer 306 after foveation (rather than performing bad pixel correction operations on the image 302 prior to foveation).

FIG. 3 conceptually illustrates performing temporal filtering on the low-resolution layer 304 to generate a temporally filtered low-resolution layer 308. In the example of FIG. 3, the temporal filtering performed on the low-resolution layer 304 can rely at least in part on a history low-resolution layer 310. The history low-resolution layer 310 can include a temporally filtered low-resolution layer generated in association with a previous iteration or temporally preceding timepoint. The history low-resolution layer 310 can thus be iteratively updated and capture scene information for multiple preceding timepoints, while limiting the number of inputs needed to generate updated temporally filtered low-resolution layers. The history low-resolution layer 310 can be thought of as a running average or running combination of low-resolution layer image content over time.

The camera that captures the image 302 can experience motion from the timepoint associated with the history low-resolution layer 310 and the capture timepoint of the image 302. For example, the image 302 can be captured by an image sensor of an HMD that is subjected to movements of the head of the user over time. To spatially align the image content of the history low-resolution layer 310 and the image 302, FIG. 3 illustrates foveated motion compensation performed on the history low-resolution layer 310 to obtain a motion compensated history low-resolution layer 312. Additional details related to performance of foveated motion compensation will be provided hereinafter with reference to FIG. 4.

The motion compensated history low-resolution layer 312 can be temporally filtered with the low-resolution layer 304 to generate the temporally filtered low-resolution layer 308. Temporally filtering the motion compensated history low-resolution layer 312 with the low-resolution layer 304 can include combining or averaging image data of the low-resolution layer 304 with image data of the motion compensated history low-resolution layer 312 using a weight map (e.g., an alpha map that defines the contribution of the low-resolution layer 304 and the motion compensated history low-resolution layer 312 to the temporally filtered low-resolution layer 308). As indicated above and in FIG. 3 by the dashed arrow extending from the temporally filtered low-resolution layer 308 to the history low-resolution layer 310, the temporally filtered low-resolution layer 308 can be used to define the history low-resolution layer for a subsequent iteration (e.g., a subsequent frame or timepoint for which foveated temporal filtering will be performed to generate output imagery).

FIG. 3 also conceptually illustrates performing temporal filtering on the ROI layer 306 to generate a temporally filtered ROI layer 314. Similar to the temporal filtering of the low-resolution layer 304, the temporal filtering performed on the ROI layer 306 can rely at least in part on a history ROI layer 316 (e.g., a temporally filtered ROI layer generated in association with a previous iteration or temporally preceding timepoint). Foveated motion compensation can be performed on the history ROI layer 316 to obtain a motion compensated history ROI layer 318. The motion compensated history ROI layer 318 can be temporally filtered with the ROI layer 306 to generate the temporally filtered ROI layer 314, such as by using a weight map to combine or average image data of the ROI layer 306 and the motion compensated history ROI layer 318. The temporally filtered ROI layer 314 can be used to define the history ROI layer for a subsequent iteration (as indicated in FIG. 3 by the dashed arrow extending from the temporally filtered ROI layer 314 to the history ROI layer 316).

In some implementations, the temporally filtered low-resolution layer 308 and the temporally filtered ROI layer 314 are generated in parallel, which can contribute to computational efficiency.

In some instances, one or more transformation operations are performed on the temporally filtered low-resolution layer 308 and/or the temporally filtered ROI layer 314 prior to further processing of the temporally filtered low-resolution layer 308 and/or the temporally filtered ROI layer 314. Such transformation operations can also advantageously be performed in parallel. FIG. 3 illustrates example transformation operations of "tone mapping" and "sharpening", which may be performed on the temporally filtered low-resolution layer 308 and/or the temporally filtered ROI layer 314. Other types of additional or alternative transformation operations may be performed on the temporally filtered low-resolution layer 308 and/or the temporally filtered ROI layer 314 prior to further processing of the temporally filtered low-resolution layer 308 and/or the temporally filtered ROI layer 314 to generate a temporally filtered image.

FIG. 3 conceptually illustrates performing de-foveation on the temporally filtered low-resolution layer 308 and the temporally filtered ROI layer 314 to generate a filtered image 320. The filtered image 320 can be generated using sharpened and tone-mapped versions of the temporally filtered low-resolution layer 308 and the temporally filtered ROI layer 314 as inputs. In the example of FIG. 3, similar to generation of the foveated image 212 as described hereinabove with reference to FIG. 2, de-foveation can include upsampling the temporally filtered low-resolution layer 308 to the original resolution of the image 302 and combining the output of the upsampling with the temporally filtered ROI layer 314 to generate the filtered image 320. For instance, the temporally filtered ROI layer 314 can be used to define a corresponding region of interest in the filtered image 320, such as by copying image data or pixel values from the temporally filtered ROI layer 314 to corresponding pixel coordinates in the filtered image 320 (i.e., to the same pixel coordinates from the image 302 used to define the ROI layer 306, indicated in FIG. 3 by the dashed rectangle within the filtered image 320).

In some implementations, the operations described with reference to FIG. 3 can be performed using an HMD (e.g., corresponding to system 100). The filtered image 320 can be used to provide an output image 322, which can be displayed on a display of the HMD. Output images can be iteratively generated and displayed to users to capture updated representations of the user's environment. In some instances, the high-resolution representation of the region of interest within the filtered image 320 (or fixation region that is the estimated subject of user attention) can enable additional user experiences with respect to the output image 322. For instance, an output image 322 can include a zoomed representation at least part of the fixation region, which can enable users to identify/interpret distant objects in their real-world environment.

Figure 4:
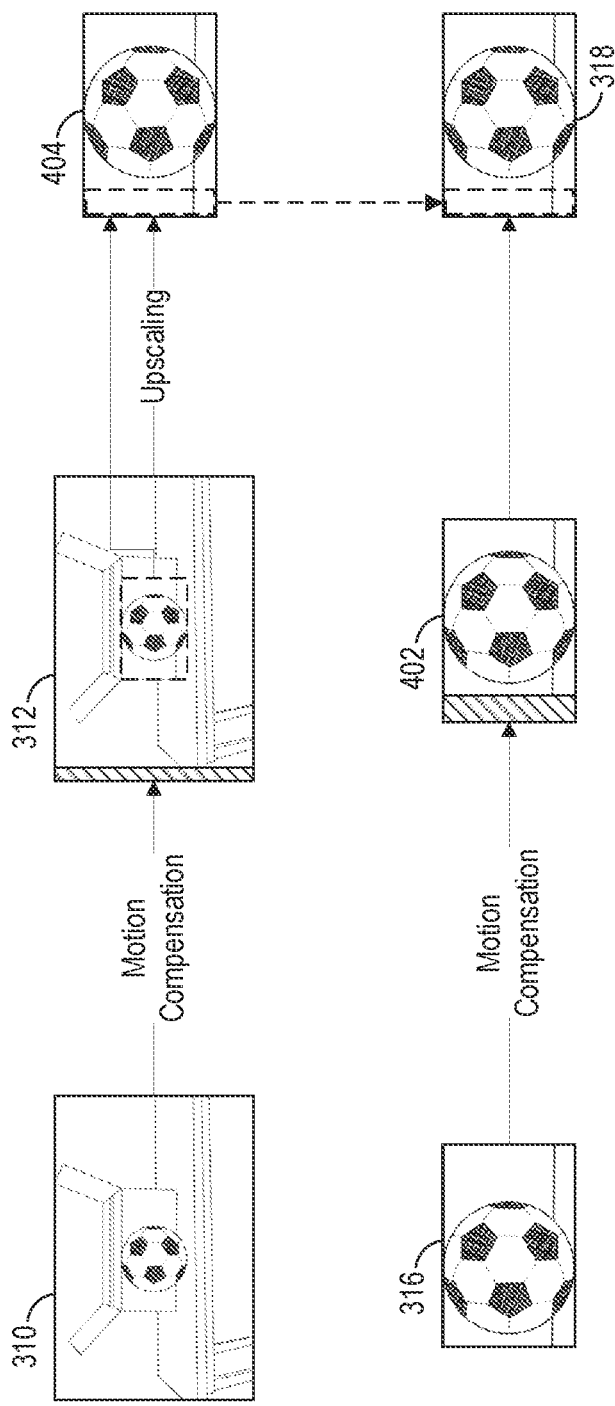
FIG. 4 illustrates a conceptual representation of performing foveated motion compensation, in accordance with implementations of the present disclosure.

FIG. 4 illustrates a conceptual representation of performing foveated motion compensation (e.g., used to transform the history low-resolution layer 310 into the motion compensated history low-resolution layer 312 and to transform the history ROI layer 316 into the motion compensated history ROI layer 318). FIG. 4 illustrates the history low-resolution layer 310 and the history ROI layer 316 from FIG. 3. Foveated motion compensation can implement interdependence between the history low-resolution layer 310 and the history ROI layer 316 to obtain the motion compensated history low-resolution layer 312 and the motion compensated history ROI layer 318.

For instance, FIG. 4 illustrates applying motion compensation to the history ROI layer 316 to obtain an initial motion compensated history ROI layer 402. The motion compensation applied to the history ROI layer 316 can rely on motion data associated with acquisition of the image 302 and can include conventional motion compensation techniques, such as using the motion data and/or optical flow techniques to transform the history ROI layer 316 to appear as though it were captured from the capture perspective associated with capturing the image 302. In the example of FIG. 4, the application of motion compensation to the history ROI layer 316 results in occluded or missing pixels in the initial motion compensated history ROI layer 402 that fail to capture scene information (indicated in FIG. 4 by the line pattern region of the initial motion compensated history ROI layer 402). If the initial motion compensated history ROI layer 402 were used to generate a filtered image, the fixation region of the filtered image would also have missing pixels, which could undermine user experiences.

Accordingly, foveated motion compensation as shown in FIG. 4 can utilize the history low-resolution layer 310 as a basis for supplementing the initial motion compensated history ROI layer 402 to obtain the motion compensated history ROI layer 318. In the example of FIG. 4, motion compensation is also applied to the history low-resolution layer 310, which can rely on motion data associated with acquisition of the image 302 and can use conventional motion compensation techniques. Applying motion compensation to the history low-resolution layer 310 can provide the motion compensated history low-resolution layer 312, which can be used in conjunction with the low-resolution layer 304 to obtain the temporally filtered low-resolution layer 308 (as discussed hereinabove with reference to FIG. 3).

FIG. 4 illustrates that the motion compensated history low-resolution layer 312 can be used to generate a supplemental history ROI layer 404, which can be used to supplement missing pixels (if any) in the initial motion compensated history ROI layer 402. In the example of FIG. 4, upscaling is performed on at least part of the motion compensated history low-resolution layer 312 to generate the supplemental history ROI layer 404. The supplemental history ROI layer 404 can include a crop of the upscaled image that corresponds to the pixel coordinates from the image 302 used to define the ROI layer 306 (indicated in FIG. 4 by the dashed rectangle within the motion compensated history low-resolution layer 312). In some instances, upscaling is performed on a crop of the motion compensated history low-resolution layer 312 (indicated in FIG. 4 by the dashed rectangle within the motion compensated history low-resolution layer 312) to obtain the supplemental history ROI layer 404.

The upscaling performed to obtain the supplemental history ROI layer 404 can result in slight blurriness in the supplemental history ROI layer 404. Notwithstanding, in the example of FIG. 4, all pixels of the supplemental history ROI layer 404 include pixel values that depict scene information (e.g., there are no missing pixels), including for the portions of the scene for which the initial motion compensated history ROI layer 402 has missing pixels (indicated by a dashed rectangle within the supplemental history ROI layer 404).

Accordingly, the supplemental history ROI layer 404 and the initial motion compensated history ROI layer 402 can be combined to generate the motion compensated history ROI layer 318 such that the motion compensated history ROI layer 318 has no missing pixels. In one example, the motion compensated history ROI layer 318 is initialized with pixel data from the supplemental history ROI layer 404, and non-missing pixel data from the initial motion compensated history ROI layer 402 is used to replace corresponding pixel data from the supplemental history ROI layer 404 to provide the motion compensated history ROI layer 318. In another example, the motion compensated history ROI layer 318 is initialized with non-missing pixel values from the initial motion compensated history ROI layer 402, and any remaining pixel values for the motion compensated history ROI layer 318 are obtained from the supplemental history ROI layer 404. Other techniques for combining the supplemental history ROI layer 404 with the initial motion compensated history ROI layer 402 can be used to generate the motion compensated history ROI layer 318.

The compensated history low-resolution layer 312 and the motion compensated history ROI layer 318 obtained via foveated temporal filtering as shown in FIG. 4 can be temporally filtered with the low-resolution layer 304 and the ROI layer 306, respectively, to obtain the temporally filtered low-resolution layer 308 and the temporally filtered ROI layer 314, respectively, as shown in FIG. 3. Inputs obtained based on the temporally filtered low-resolution layer 308 and the temporally filtered ROI layer 314 can be combined via de-foveation to obtain the filtered image 320. The temporally filtered low-resolution layer 308 can be used to define a history low-resolution layer for a subsequent foveated temporal filtering iteration, and the temporally filtered ROI layer 314 can be used to define a history ROI layer for a subsequent foveated temporal filtering iteration.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

The acts described with reference to FIGS. 5, 6, and 7 can be performed using one or more components of one or more systems 100 described hereinabove with reference to FIG. 1, such as processor(s) 102, storage 104, sensor(s) 110, I/O system(s) 114, communication system(s) 116, remote system(s) 118, etc.

Figure 5:
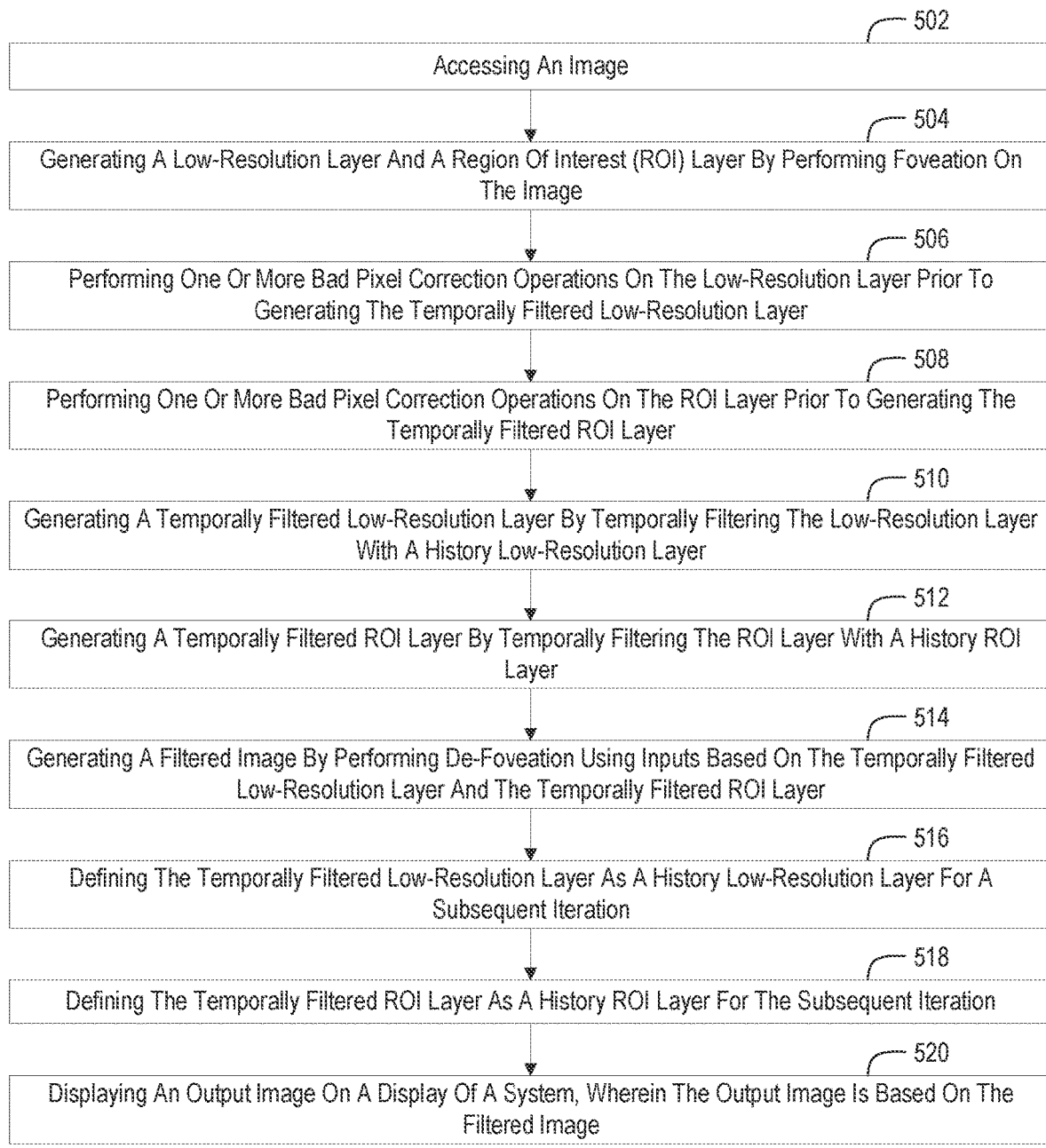
FIG. 5 illustrates an example flow diagram depicting acts associated with performing foveated temporal filtering, in accordance with implementations of the present disclosure.

FIG. 5 illustrates an example flow diagram 500 depicting acts associated with performing foveated temporal filtering.

Act 502 of flow diagram 500 includes accessing an image. In some instances, the image is captured by an image sensor of an HMD.

Act 504 of flow diagram 500 includes generating a low-resolution layer and a region of interest (ROI) layer by performing foveation on the image.

Act 506 of flow diagram 500 includes performing one or more bad pixel correction operations on the low-resolution layer prior to generating the temporally filtered low-resolution layer.

Act 508 of flow diagram 500 includes performing one or more bad pixel correction operations on the ROI layer prior to generating the temporally filtered ROI layer.

Act 510 of flow diagram 500 includes generating a temporally filtered low-resolution layer by temporally filtering the low-resolution layer with a history low-resolution layer. In some implementations, temporally filtering the low-resolution layer with the history low-resolution layer comprises combining image data of the low-resolution layer with image data of the history low-resolution layer in accordance with a weight map. In some examples, the history low-resolution layer comprises a motion compensated history low-resolution layer.

Act 512 of flow diagram 500 includes generating a temporally filtered ROI layer by temporally filtering the ROI layer with a history ROI layer. In some instances, temporally filtering the ROI layer with the history ROI layer comprises combining image data of the ROI layer with image data of the history ROI layer in accordance with a weight map. In some implementations the history ROI layer comprises a motion compensated history ROI layer.

Act 514 of flow diagram 500 includes generating a filtered image by performing de-foveation using inputs based on the temporally filtered low-resolution layer and the temporally filtered ROI layer. In some examples, the inputs used for performing de-foveation comprise (i) a tone-mapped or sharpened temporally filtered low-resolution layer, and a tone-mapped or sharpened temporally filtered ROI layer.

Act 516 of flow diagram 500 includes defining the temporally filtered low-resolution layer as a history low-resolution layer for a subsequent iteration.

Act 518 of flow diagram 500 includes defining the temporally filtered ROI layer as a history ROI layer for the subsequent iteration.

Act 520 of flow diagram 500 includes displaying an output image on a display of a system, wherein the output image is based on the filtered image. In some instances, the output image comprises a zoomed representation of at least part of a fixation region of the filtered image.

Figure 6:
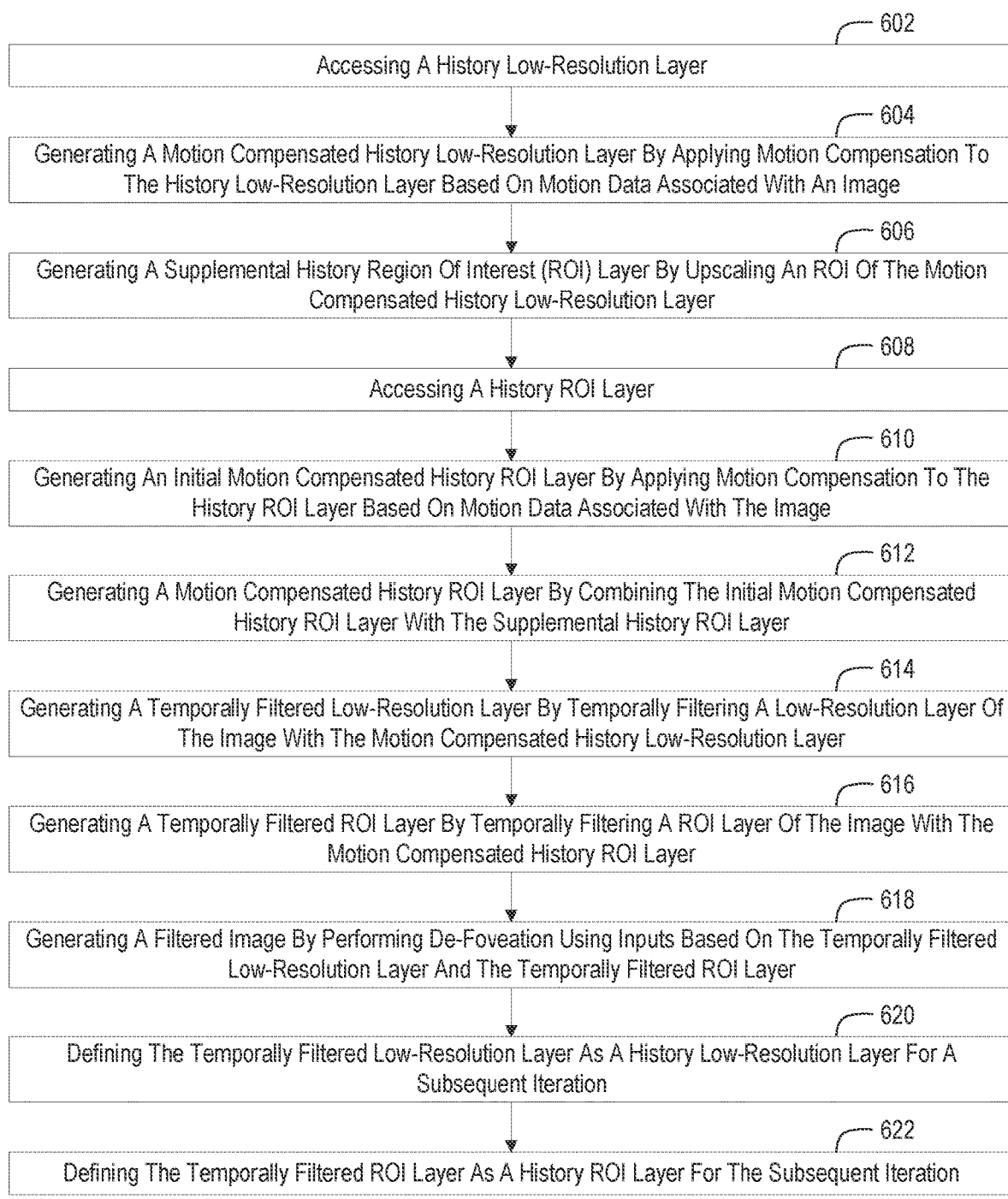
FIG. 6 illustrates an example flow diagram depicting acts associated with performing foveated motion compensation, in accordance with implementations of the present disclosure.

FIG. 6 illustrates an example flow diagram 600 depicting acts associated with performing foveated motion compensation.

Act 602 of flow diagram 600 includes accessing a history low-resolution layer.

Act 604 of flow diagram 600 includes generating a motion compensated history low-resolution layer by applying motion compensation to the history low-resolution layer based on motion data associated with an image.

Act 606 of flow diagram 600 includes generating a supplemental history region of interest (ROI) layer by upscaling an ROI of the motion compensated history low-resolution layer. Act 608 of flow diagram 600 includes accessing a history ROI layer.

Act 610 of flow diagram 600 includes generating an initial motion compensated history ROI layer by applying motion compensation to the history ROI layer based on motion data associated with the image.

Act 612 of flow diagram 600 includes generating a motion compensated history ROI layer by combining the initial motion compensated history ROI layer with the supplemental ROI layer. In some implementations, generating the motion compensated history ROI layer comprises (i) initializing the motion compensated history ROI layer with pixel data from the supplemental history ROI layer, and (ii) using non-missing pixel data from the initial motion compensated history ROI layer to replace corresponding pixel data from the supplemental history ROI layer.

Act 614 of flow diagram 600 includes generating a temporally filtered low-resolution layer by temporally filtering a low-resolution layer of the image with the motion compensated history low-resolution layer.

Act 616 of flow diagram 600 includes generating a temporally filtered ROI layer by temporally filtering a ROI layer of the image with the motion compensated history ROI layer.

Act 618 of flow diagram 600 includes generating a filtered image by performing de-foveation using inputs based on the temporally filtered low-resolution layer and the temporally filtered ROI layer.

Act 620 of flow diagram 600 includes defining the temporally filtered low-resolution layer as a history low-resolution layer for a subsequent iteration.

Act 622 of flow diagram 600 includes defining the temporally filtered ROI layer as a history ROI layer for the subsequent iteration.

Figure 7:
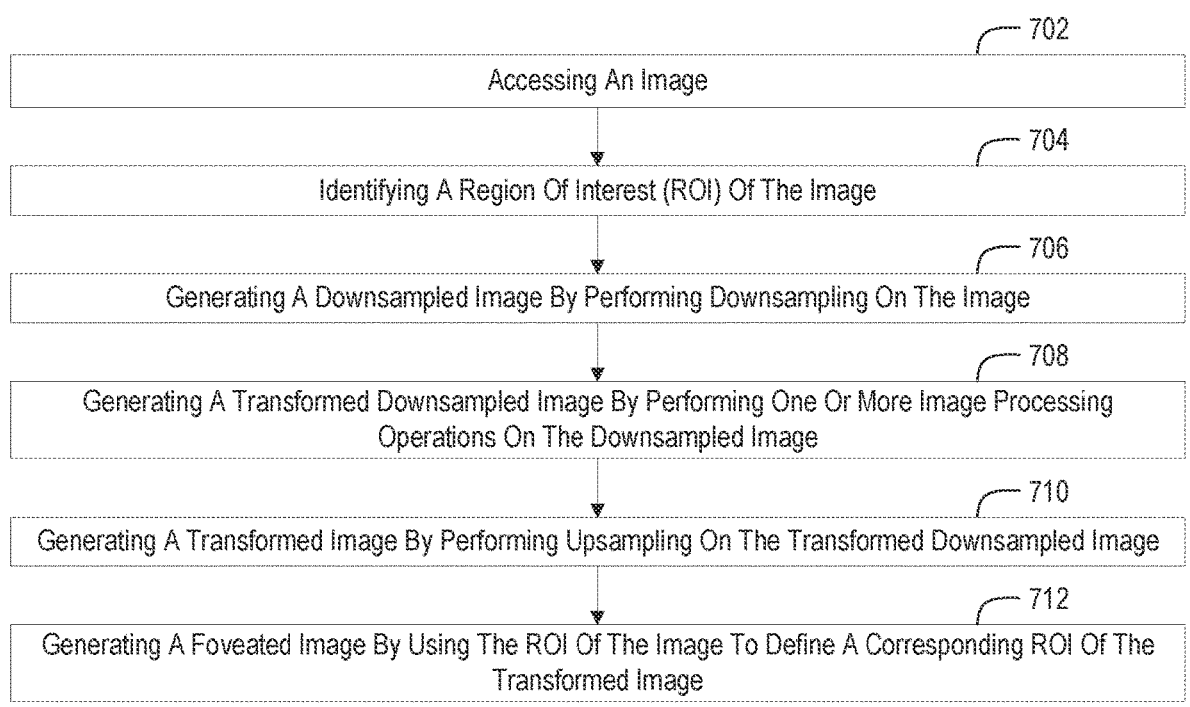
FIG. 7 illustrates an example flow diagram depicting acts associated with generating foveated imagery, in accordance with implementations of the present disclosure.

FIG. 7 illustrates an example flow diagram 700 depicting acts associated with generating foveated imagery.

Act 702 of flow diagram 700 includes accessing an image.

Act 704 of flow diagram 700 includes identifying a region of interest (ROI) of the image. In some examples, the ROI of the image comprises a pixel region with pre-defined coordinates. In some instances, the ROI of the image comprises a pixel region with coordinates defined based on eye tracking data.

Act 706 of flow diagram 700 includes generating a downsampled image by performing downsampling on the image.

Act 708 of flow diagram 700 includes generating a transformed downsampled image by performing one or more image processing operations on the downsampled image. In some implementations, the one or more image processing operations comprise one or more temporal filtering operations.

Act 710 of flow diagram 700 includes generating a transformed image by performing upsampling on the transformed downsampled image.

Act 712 of flow diagram 700 includes generating a foveated image by using the ROI of the image to define a corresponding ROI of the transformed image. In some examples, generating the foveated image comprises copying image data of the ROI of the image to the corresponding ROI of the transformed image.

Additional Details Related to the Disclosed Embodiments

Disclosed embodiments may comprise or utilize a special-purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "computer-readable recording media", "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry program code in the form of computer-executable instructions or data structures, and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for facilitating foveated temporal filtering, the system comprising:
    one or more processors; and
    one or more computer-readable recording media that store instructions that are executable by the one or more processors to configure the system to:
        access an image;
        generate a low-resolution layer and a region of interest (ROI) layer by performing foveation on the image;
        generate a temporally filtered low-resolution layer by temporally filtering the low-resolution layer with a history low-resolution layer;
        generate a temporally filtered ROI layer by temporally filtering the ROI layer with a history ROI layer; and
        generate a filtered image by performing de-foveation using inputs based on the temporally filtered low-resolution layer and the temporally filtered ROI layer.

2. The system of claim 1, wherein temporally filtering the low-resolution layer with the history low-resolution layer comprises combining image data of the low-resolution layer with image data of the history low-resolution layer in accordance with a weight map.

3. The system of claim 1, wherein temporally filtering the ROI layer with the history ROI layer comprises combining image data of the ROI layer with image data of the history ROI layer in accordance with a weight map.

4. The system of claim 1, wherein the history low-resolution layer comprises a motion compensated history low-resolution layer, and wherein the history ROI layer comprises a motion compensated history ROI layer.

5. The system of claim 1, wherein the instructions are executable by the one or more processors to further configure the system to:
    perform one or more bad pixel correction operations on the low-resolution layer prior to generating the temporally filtered low-resolution layer; and
    perform one or more bad pixel correction operations on the ROI layer prior to generating the temporally filtered ROI layer.

6. The system of claim 1, wherein the inputs used for performing de-foveation comprise:
    a tone-mapped or sharpened temporally filtered low-resolution layer; and
    a tone-mapped or sharpened temporally filtered ROI layer.

7. The system of claim 1, wherein the instructions are executable by the one or more processors to further configure the system to:
    define the temporally filtered low-resolution layer as a history low-resolution layer for a subsequent iteration; and
    define the temporally filtered ROI layer as a history ROI layer for the subsequent iteration.

8. The system of claim 1, wherein the system comprises a head-mounted display (HMD), and wherein the image is captured by an image sensor of the HMD.

9. The system of claim 8, wherein the instructions are executable by the one or more processors to further configure the system to display an output image on a display of the HMD, wherein the output image is based on the filtered image.

10. The system of claim 9, wherein the output image comprises a zoomed representation of at least part of a fixation region of the output image.

11. A system for performing foveated motion compensation, the system comprising:
    one or more processors; and
    one or more computer-readable recording media that store instructions that are executable by the one or more processors to configure the system to:
        access a history low-resolution layer;
        generate a motion compensated history low-resolution layer by applying motion compensation to the history low-resolution layer based on motion data associated with an image;

generate a supplemental history ROI layer by upscaling an ROI of the motion compensated history low-resolution layer;

access a history ROI layer;

generate an initial motion compensated history ROI layer by applying motion compensation to the history ROI layer based on motion data associated with the image; and generate a motion compensated history ROI layer by combining the initial motion compensated history ROI layer with the supplemental history ROI layer.

12. The system of claim 11, wherein generating the motion compensated history ROI layer comprises:

initializing the motion compensated history ROI layer with pixel data from the supplemental history ROI layer; and using non-missing pixel data from the initial motion compensated history ROI layer to replace corresponding pixel data from the supplemental history ROI layer.

13. The system of claim 11, wherein the instructions are executable by the one or more processors to further configure the system to:

generate a temporally filtered low-resolution layer by temporally filtering a low-resolution layer of the image with the motion compensated history low-resolution layer; and generate a temporally filtered ROI layer by temporally filtering a ROI layer of the image with the motion compensated history ROI layer.

14. The system of claim 13, wherein the instructions are executable by the one or more processors to further configure the system to generate a filtered image by performing de-foveation using inputs based on the temporally filtered low-resolution layer and the temporally filtered ROI layer.

15. The system of claim 13, wherein the instructions are executable by the one or more processors to further configure the system to:

define the temporally filtered low-resolution layer as a history low-resolution layer for a subsequent iteration; and define the temporally filtered ROI layer as a history ROI layer for the subsequent iteration.

16. A system for generating foveated imagery, the system comprising:

one or more processors; and one or more computer-readable recording media that store instructions that are executable by the one or more processors to configure the system to:

access an image;

identify an ROI of the image;

generate a downsampled image by performing downsampling on the image;

generate a transformed downsampled image by performing one or more image processing operations on the downsampled image;

generate a transformed image by performing upsampling on the transformed downsampled image; and generate a foveated image by using the ROI of the image to define a corresponding ROI of the transformed image.

17. The system of claim 16, wherein the ROI of the image comprises a pixel region with pre-defined coordinates.

18. The system of claim 16, wherein the ROI of the image comprises a pixel region with coordinates defined based on eye tracking data.

19. The system of claim 16, wherein the one or more image processing operations comprise one or more temporal filtering operations.

20. The system of claim 16, wherein generating the foveated image comprises copying image data of the ROI of the image to the corresponding ROI of the transformed image.

* * * * *